United States Patent [19]

Kopish et al.

[11] Patent Number: 4,755,035
[45] Date of Patent: Jul. 5, 1988

[54] DISPLAY ASSEMBLY FOR LCD'S

[75] Inventors: Stephen P. Kopish, Wheeling; Michael L. Shababy, Stone Park; Steven Rokita, Chicago, all of Ill.

[73] Assignee: Motorola, Inc., Schaumburg, Ill.

[21] Appl. No.: 107,854

[22] Filed: Oct. 6, 1987

Related U.S. Application Data

[63] Continuation-in-part of Ser. No. 833,936, Feb. 25, 1986.

[51] Int. Cl.⁴ .............................................. G02F 1/13
[52] U.S. Cl. ..................................... 350/345; 350/334
[58] Field of Search .................. 350/334, 345; 368/30, 368/84, 242; 362/19, 20

[56] References Cited

U.S. PATENT DOCUMENTS

| | | | |
|---|---|---|---|
| 3,864,905 | 2/1975 | Richardson | 58/50 R |
| 4,017,155 | 4/1977 | Yagi et al. | 350/160 LC |
| 4,212,048 | 7/1980 | Castleberry | 362/19 |
| 4,218,775 | 8/1980 | Cox et al. | 455/344 |
| 4,252,416 | 2/1981 | Jaccard | 350/345 |
| 4,277,817 | 7/1981 | Hehr | 362/31 |
| 4,294,517 | 10/1981 | Jakubek | 350/345 |

FOREIGN PATENT DOCUMENTS

| | | | |
|---|---|---|---|
| 0167368 | 1/1986 | European Pat. Off. | 350/334 |
| 2121583 | 12/1983 | United Kingdom | 350/334 |

OTHER PUBLICATIONS

"An LCD Display Assembly", by Steven P. Kopish and Ronald E. Petersen, Motorola Technical Developments, vol. 2, Jan. 1982, pp. 51–52.

"Light Balancing for Multiple Gauges", by Tom R. Kawall, Motorola Technical Developments, vol. 4, Apr. 1984, pp. 40–41.

"Lighting Arrangement for Instruments", by Tom R. Kawall, Motorola Technical Developments, vol. 4, Apr. 1984, pp. 48–49.

Primary Examiner—Stanley D. Miller
Assistant Examiner—Trong Quang Phan
Attorney, Agent, or Firm—Phillip H. Melamed

[57] ABSTRACT

A display assembly for an LCD device is disclosed wherein the LCD essentially comprises an elongated horizontal plate. The LCD is mounted in a recessed portion of the top surface of a carrier made of light transmitting material with preferably the back surface of the LCD contacting the carrier top surface. Beneath the LCD, the carrier has an effective wedge-shaped portion, or at least an inclined planar surface of the carrier, and a light source is effectively positioned adjacent the carrier. At least one retainer member is utilized to mount the LCD to the carrier with edges of the carrier top surface recessed portion laterally surrounding and thereby laterally locating the LCD device with respect to the carrier. The preceding configuration allows the carrier to provide for backlighting of the LCD since the carrier serves as a light pipe in addition to providing mounting structure for the LCD. Lateral extending portions of the top surface of the carrier are positioned adjacent to graphics, in a coverplate of the LCD assembly, which are to be backlighted. The retainer member may comprise a molded plastic part having two main planar extensions forming an angle less than the angle of the carrier end surfaces which mate with the retainer. Such retainer member has latching projections that engage the carrier such that a snap-together subassembly, capable of hand assembly, is provided comprising the carrier, the LCD and the retainer member.

26 Claims, 5 Drawing Sheets

Fig. 3
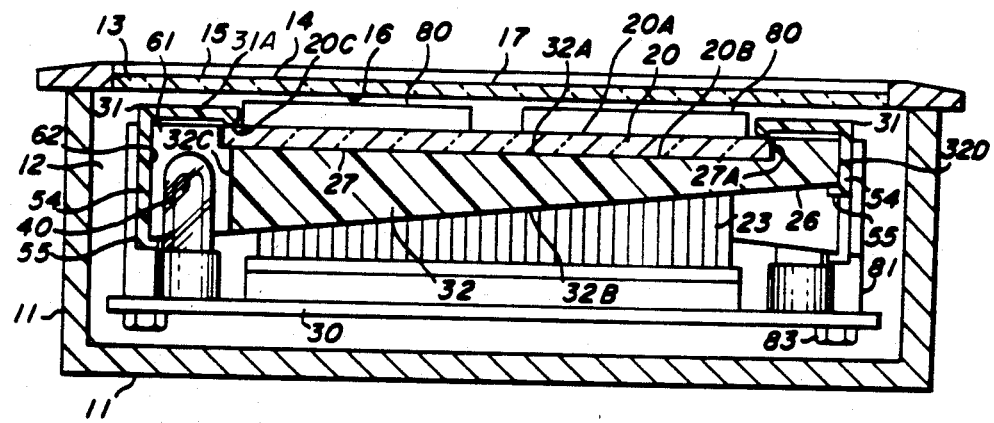
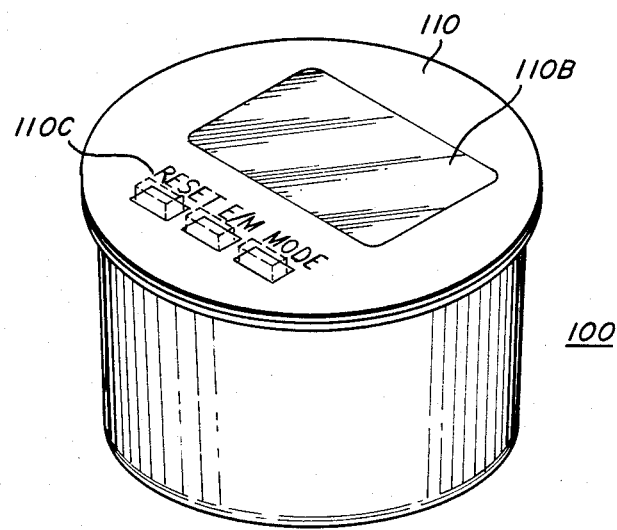
Fig. 4

DISPLAY ASSEMBLY FOR LCD'S

This is a continuation-in-part of application Ser. No. 833,936 filed Feb. 25, 1986.

BACKGROUND OF THE INVENTION

The present invention is related to display assemblies usable for mounting and providing illumination for LCD (liquid crystal display) devices. More specifically, the present invention is related to such display assemblies which provide suitable backlighting for LCD devices.

Typically, LCD's have a general plate-type configuration and are electrically connected to driver electronics such that various graphic patterns can be selectively provided when the LCD is viewed from either its top or bottom surface. LCD assemblies may be configured just to utilize ambient reflected light, but typically these assemblies are unsuitable for low levels of ambient light. In such situations, selective electrical backlighting of the LCD is typically provided. Various techniques are utilized to provide uniform electrical backlighting of the LCD.

Generally the LCD is mounted in a display housing and is positioned within the housing by an LCD carrier to which the LCD is mounted. The carrier is used to properly orient the LCD with respect to the housing and other components. The carrier and LCD are then mounted to a printed circuit board, containing the LCD drive electronics, which is mounted to the display housing.

Typically, assemblies such as those described above are relatively complex and require a number of individual parts to insure both uniform lighting of the LCD and proper mounting of the LCD within the display housing. An example of one such previous display assembly is illustrated in an article entitled "An LCD Display Assembly", pages 51–52 of Volume 2, Motorola Technical Developments, January, 1982. The display assembly illustrated in this article utilizes numerous mounting structures and requires complex assembly since, until the LCD and carrier are mounted to the printed circuit board, a large number of assembly components are only loosely positioned in their appropriate places. In addition, the above-noted assembly would require, if possible, additional structure in order to accomplish uniform backlighting of the LCD by any point light source. Also, typically fixed graphic legends are provided and associated with the LCD display, wherein such graphics are desired to be constantly illuminated, as contrasted with the selective LCD visual display to be produced. Providing illumination for these graphics would typically require separate additional light illumination sources and/or structure which would further complicate the LCD assembly.

While some prior systems have proposed utilization of wedge-shaped light pipe structures to obtain uniform backlighting of LCD devices, providing such an additional wedge-shaped light pipe structure would appear to even further complicate assemblies such as that shown in the above-noted Motorola article.

SUMMARY OF THE INVENTION

An object of the present invention is to provide an improved LCD display assembly which overcomes the above-mentioned deficiencies of prior display assemblies.

In one embodiment of the present invention an LCD display assembly is provided. The display assembly comprises an LCD device having a general plate-type configuration with substantially planar top and bottom surfaces, the LCD device selectively providing a desired visual display when the device is viewed from above the LCD top surface. A carrier is provided which has top and bottom surfaces. The carrier top surface has a recessed portion within which the LCD device is positioned, and edges of the carrier recessed portion laterally surround the LCD device and thereby laterally locate the LCD device with respect to the carrier. A retainer means is provided which is coupled to and joins together the LCD device and the carrier. The retainer means has extending portions which contact peripheral portions of the LCD top surface and bias the LCD device against the carrier. A light source is provided for lighting the LCD device. In the present invention, the carrier is made from a light transmitting material and has a generally wedge-shaped portion that has a substantially planar top surface, which is part of the carrier recessed top surface portion, positioned in effective planar surface contact with the LCD bottom surface. The carrier has a substantially planar bottom surface of the wedge portion inclined with respect to the wedge top surface, and the wedge portion has major and minor generally vertically projecting end surfaces between and located generally at opposite ends of the top and bottom wedge surfaces. The light source is effectively positioned adjacent the major vertical end surface of the wedge portion, and the wedge portion effectively forms a light pipe for obtaining uniform backlighting of the LCD device by the light source while also providing a carrier structure for the LCD device.

The above-noted configuration of components result in a simplified assembly for the present LCD display assembly invention. This is because the carrier not only provides for locating and providing protection for the LCD device, but also, due to its being constructed of light transmitting material, the carrier provides for uniform backlighting of the LCD since the carrier also serves as a light pipe. The wedge-shaped portion of the carrier is utilized to insure uniform backlighting of the LCD device which preferably comprises an elongated plate configuration with a major axis of the LCD device extending generally from effective major and minor vertical end surfaces of the wedge-shaped portion of the carrier.

A major feature of the present invention is that a planar surface of the carrier is positioned beneath and inclined with respect to the LCD bottom surface. This will provide LCD backlighting from a point light source effectively positioned adjacent to the carrier. The exact configuration of the retainer means is not significant for this specific feature. In addition, for some embodiements of this feature, the carrier portion beneath the LCD may not necessarily be in the form of a wedge, and even if a wedge, this portion is not necessarily directly in planar contact with the LCD bottom surface, and may be spaced therefrom.

Preferably, the top surface of the carrier has lateral extending portions that are positioned laterally adjacent to the LCD device top surface. Since the carrier is of light transmitting material, these lateral extending portions will also be illuminated by the light source. These portions of the carrier top surface will be positioned adjacent graphics in a display coverplate which has a clear viewing area positioned directly above the LCD top surface. This configuration readily permits illumination of the graphics with no substantial increase in display cost or complexity.

In addition to the preceding features, the retainer means utilized in the present invention will preferably comprise at least one molded plastic part, a spring clip, having extending spring action fingers that contact the LCD device and carrier and provide a snap-together subassembly which can be assembled by hand. Typically the retainer clip will have two main planar surfaces that form an angle which is nominally less than the angle of a mating rigid end corner of the carrier to which the retainer will mate. Generally two of these retainer clips will be provided.

Preferably, the LCD device will not utilize the conventional zebra strips that typically provide electrical connection to the LCD device. Instead, flexible flat printed circuit cables will provide electrical connections between drive electronics and the LCD device. Elongated slots are provided in the carrier for these cables which connect the LCD device to drive electronics mounted on a printed circuit board positioned below the wedge portion bottom surface.

In addition, preferably a pair of LCD devices will be mounted to the same carrier with each device comprising an elongated plate configuration with the major elongated axes of the LCD devices being substantially parallel to one another. With this configuration, preferably separate wedge-shaped portions are provided in the carrier for each of the LCD's with the bottom inclined surfaces of each of the wedge-shaped portions each extending upward towards the LCD but in generally opposite lateral directions such that each wedge-shaped portion has its associated major vertical end surface located at opposite ends of the carrier. With this configuration, separate light sources are positioned adjacent to each of the major vertical end surfaces of the carrier. The light sources will provide uniform backlighting for the pair of LCD devices.

Preferably, threaded holes in mounting posts are provided in the carrier such that mounting screws subsequently mount the carrier subassembly, comprising the carrier, LCD devices and snap-on clips, to the printed circuit board assembly containing the drive electronics.

The above features of the present invention, as well as additional advantages and features of the present invention, are discussed further in the subsequent detailed description of the present invention.

BRIEF DESCRIPTION OF THE DRAWINGS

For a more complete understanding of the present invention, reference should be made to the drawings in which:

FIG. 3 is a cross-sectional view of the display assembly shown in FIGS. 1 and 2 taken along the lines 3—3 in FIGS. 1 and 2 after assembly of the components;

FIG. 4 is a perspective view of another LCD assembly;

DESCRIPTION OF THE PREFERRED EMBODIMENTS OF THE INVENTION

Figure 1:
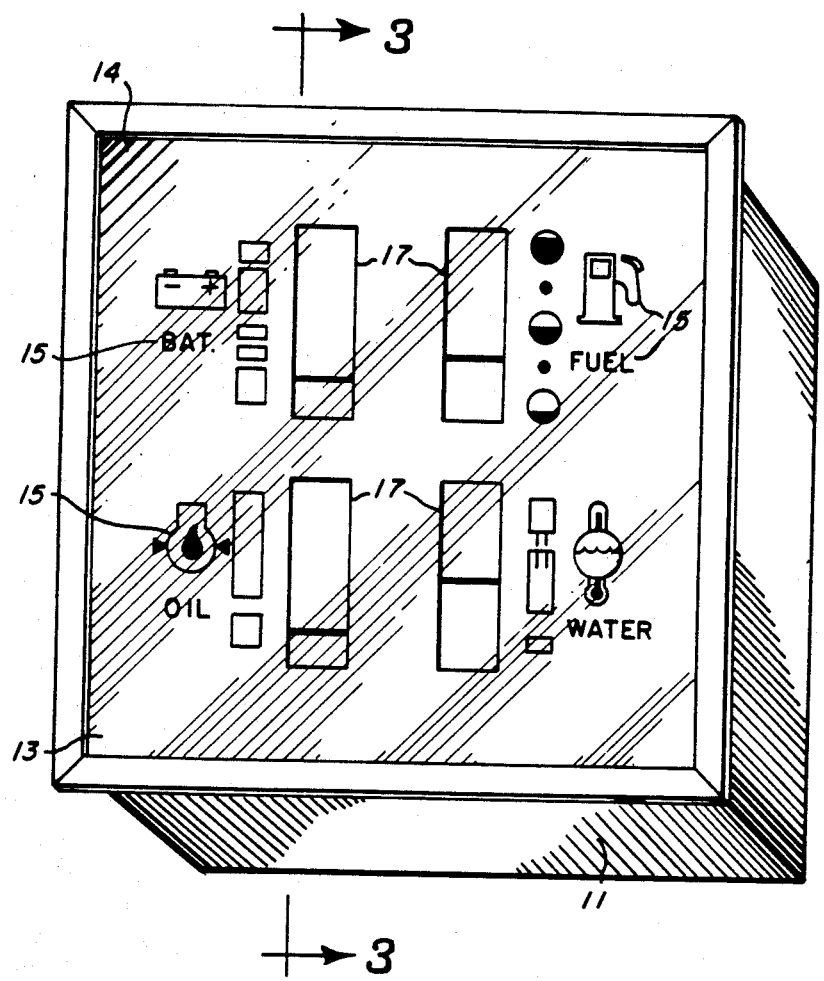
FIG. 1 is a perspective view of a fully-assembled LCD assembly constructed in accordance with the present invention.
Figure 2:
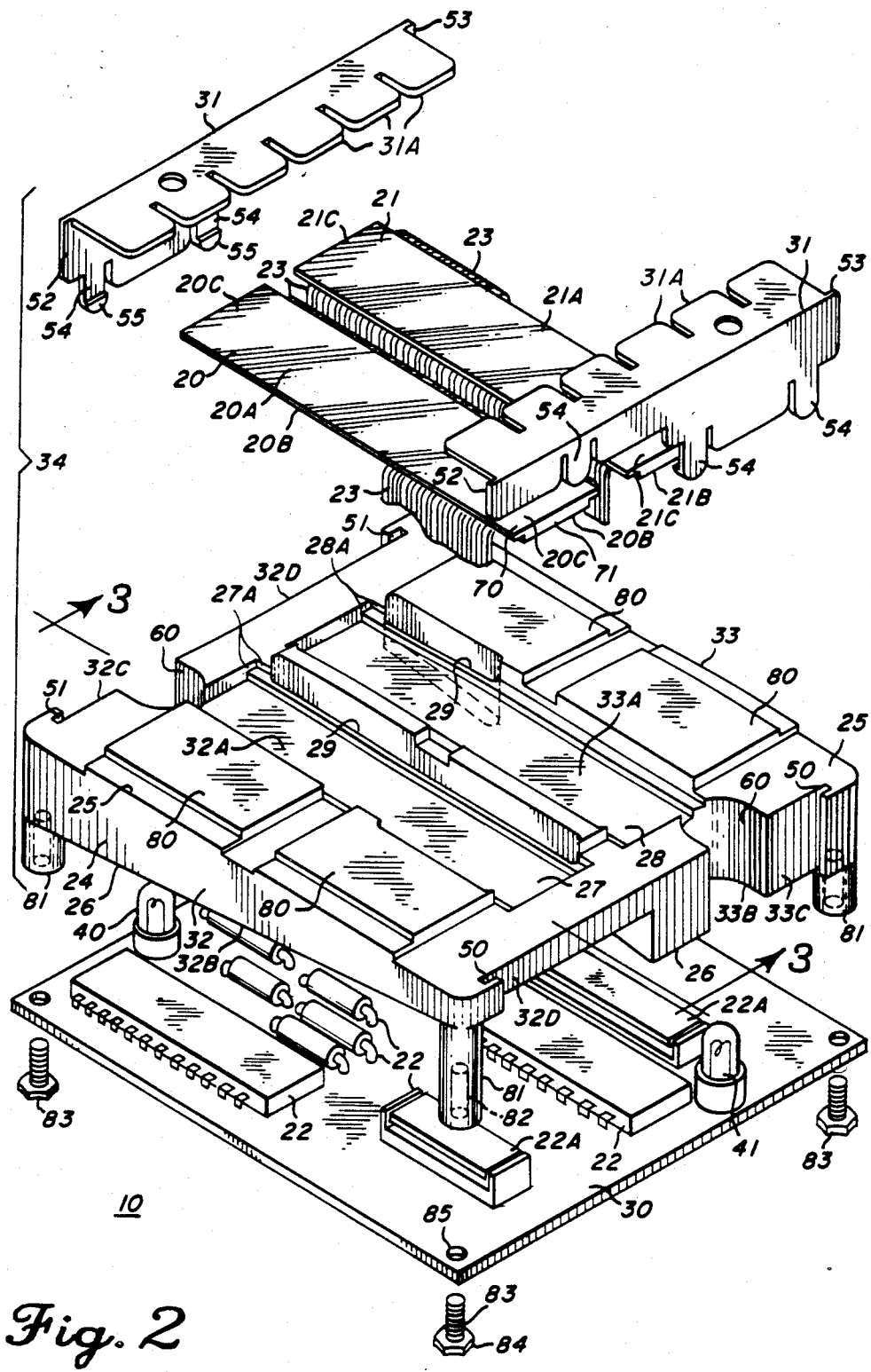
FIG. 2 is an exploded perspective view illustrating several major components of the display assembly shown in FIG. 1.

Referring to FIG. 1, an LCD display assembly 10 is illustrated after assembly of all of its components. FIG. 2 illustrates major components of this same assembly 10, but illustrates them in exploded assembly form. FIG. 1 shows a cross-sectional view of the assembly 10. The assembly 10 includes a metal outer housing 11 which essentially provides an internal cavity 12 for substantially all components of the display assembly. This internal cavity is closed by a top thick glass coverplate 13 having a horizontal top view surface 14, which includes graphics 15 intended to be constantly illuminated, and a substantially planar bottom surface 16. The coverplate also includes four clear areas 17 through which top surfaces of a pair of LCD's are viewable. Each of the LCD's will selectively provide desired visual displays, movable bar lines, for example, in accordance with received electrical drive signals.

It should be noted that the terms "horizontal", "vertical", "top" and "bottom" are utilized herein merely to designate the relative orientation of the positioning of various components of the present invention, wherein these terms directly apply to the display assembly as shown in FIGS. 2 and 3. However, clearly the display assembly, while illustrated in FIGS. 2 and 3 in essentially a horizontal orientation, could be subsequently rotated to provide a vertical orientation, or any other desires orientation. Thus, it should be understood that the preceding terms merely designate relative orientation positioning. The term "lateral" as used herein refers to a horizontal orientation as shown in FIGS. 2 and 3.

Referring now more specifically to FIG. 2, the display assembly 10 is illustrated as comprising a pair of LCD devices 20 and 21 each having a general elongated rectangular plate-type configuration with substantially planar top and bottom surfaces 20A and 20B and 21A and 21B, respectively. Each of the LCD devices is capable of selectively providing a desired visual display when the top surface of the device is viewed from above its top surface. The selection of the display to be provided is determined by display drive electronics 22 which, while only partially shown in FIG. 2, will be connected to the LCD's through flexible flat printed circuit cables generally designated by the reference numeral 23 that emanate from elongated lateral sides of the LCD devices 20 and 21. Only portions of the cables 23 are shown in FIG. 2 to maintain clarity of the drawing.

The LCD devices 20 and 21 will be mounted to a unitary LCD carrier 24. The carrier 24 has top and bottom surfaces 25 and 26, respectively, with each of the LCD devices 20 and 21 being positioned within recessed portions 27 and 28 of the carrier top surface 25. It should be noted that edges 27A and 28A of the recessed portions 27 and 28 laterally surround each of the LCD devices and thereby laterally locate these devices with respect to the carrier. Elongated through slots 29 extend from the carrier top and bottom surfaces 25 and 26 and provide through paths for the flexible cables 23 associated with each of the LCD devices. It is contemplated that while the LCD devices are mounted on the top surface of the carrier 24, the drive electronics 22 associated with each of these devices will be positioned beneath the opposite, or bottom, side 26 of the carrier 24, preferably on a printed circuit board 30 positioned effectively below the carrier 24 as shown in FIG. 2. Cable receptables 22A for the cables 23 are part of the drive electronics 22 positioned on the circuit board 30.

A pair of retainer clips 31 are illustrated in FIGS. 2 and 3 and are coupled to and join together the LCD devices 20 and 21 and the carrier 24 to form a snap-together subassembly 34 which can be assembled by hand. Each retainer clip 31 has extending portions 32, preferably comprising a number of individual extending fingers, which contact peripheral end portions 20C and 21C of the LCD top surfaces and bias the LCD devices toward and against the carrier 24.

A main feature of the present invention is that the carrier 24 is a unitary molded part made of a clear light transmitting material, for example a plastic. Preferably the carrier 24 comprises a polycarbonate, rather than an acrylic, molded part wherein the preferred polycarbonate comprises Lexan. While polycarbonate is not as light-transmissive as acrylic, it is more uniform in its light-transmitting properties, and therefore is preferred.

The carrier 24 provides two wedge-shaped portions 32 and 33 which are essentially positioned beneath each of the LCD devices 20 and 21, respectively. Each of the wedge-shaped portions of the carrier has a substantially planar top surface 32A and 33A, which is part of the carrier recessed top surface portions 27 and 28, respectively. The surfaces 32A and 33A are effectively coplanar. The wedge planar top surfaces are positioned in effective planar surface contact with the bottom surfaces 20B and 21B of the LCD, respectively. In addition, the wedge portions 32 and 33 have substantially planar associated bottom surfaces 32B and 33B which are inclined with respect to the wedge top surfaces 32A and 33A, respectively, thereby providing each wedge portion with its wedge-type shape. The wedge portions 32 and 33 also each have associated major and minor generally vertically projecting end surfaces wherein the major vertical end surfaces are designated by the surfaces 32C and 33C and the minor vertical end surfaces have the designations 32D and 33D. The major and minor vertical end surfaces associated with each of the wedges extend between and are located generally at opposite ends of the top and bottom wedge surfaces. It should be noted that each of the wedge bottom surfaces 32B and 33B are inclined with respect to their associated wedge top surfaces 32A and 33B, but are oriented such that they extend upwardly with respect to the plane of the wedge top surfaces in generally opposite lateral (horizontal) directions.

As illustrated in FIG. 2, a pair of light sources 40 and 41 are provided either on or associated with the printed circuit board 30. After assembly, each of the light sources will be effectively positioned adjacent to an associated one of the major vertical end surfaces 32C and 33C. With this configuration, the carrier 24 will function not only as a locating carrier device for both of the LCD devices 20 and 21, but will also function as a unitary light pipe device such that each of the light sources 40 and 41, comprising electric lamps, can provide uniform backlighting of the LCD devices.

Details concerning the mounting of the retainer clips 31 on the carrier 24 will now be discussed. The carrier 24, for each of the retainer clips 31, has an associated pair of end guide slots 50, 51, each slot of each pair of slots being associated with one major or minor vertical extending end surface of one of the wedge-shaped portions of the carrier. These end guide slots cooperate with end portions 52 and 53 of each of the retainer clips 31 to assist in both properly locating the retainer clip with respect to the carrier and fixing the retainer to the carrier. As was previously noted, spring action fingers of the extending portions 31A will be positioned so as to contact and press against peripheral portions of the LCD devices 20 and 21 so as to bias these devices downward toward the carrier 24. In addition, vertically downwardly extending projections 54 are provided on the retainer clips 31 with each of these fingers having an inward end latching projection 55 for engaging, when the retainer clip is mounted to the carrier, a portion of the bottom surface 26 of the carrier 24. This structure enables the present invention to provide the snap-together subassembly 34 comprising the carrier 24, the LCD devices 20 and 21 mounted in the carrier recessed portions 27, 28 and the pair of retainer clips 31.

Preferably, each retainer clip 31 essentially comprises two main substantially planar extensions, one including the extending spring fingers 31A and another including the extending projections 54. These planar extensions are joined together and form an angle which is nominally (without providing any biasing stress to the retainer clip 31) less than the angle provided by the junction of the carrier top surface 25 and the vertical end surfaces, such as 32C and 33D, at one end of the carrier 24, to which the retainer clip 31 will be mounted. In this manner, when the retainer is inserted in the guide slots 50, 51, downward movement of the retainer will flex the spring fingers 31A to provide spring bias to maintain the LCD's in the recessed portions of the carrier, and when the inward latching projections 55 at the ends of the fingers 54 contact the bottom surface 26 of the carrier 20, the self-locking subassembly 29 is provided. This subassembly can be assembled by hand. Preferably, the retainer clip 31 comprises an unitary molded plastic part with all planar surfaces of the retainer clip 31 that are positioned adjacent the carrier 24 being light-reflective so as to minimize interference with the light pipe function of the carrier 24.

Preferably, each of the major vertical end surfaces 32C, and 33C include a recessed portion 60. Each of the light sources 40 and 41 is positioned, after assembly, within a cavity 61 bounded by this recessed portion 60 and a light-reflecting inner surface 62 of the vertically downwardly extension 54 of the retainer clip 31. In this manner, substantially all light emitted by the light sources 40 and 41 will be directed into the wedge-shaped portions of the carrier 24 which then acts as a light pipe to provide uniform backlighting illumination for the LCD's, as well as to provide illumination for the graphics 15 provided on the display coverplate 12.

Preferably the present invention contemplates the use of the flexible cables 23 for providing electrical connection to the LCD devices 20 and 21. This is instead of the commonly-used "zebra" strips which comprise a solid rectangular strip of material having alternating conductor rings provided thereon. Typically these zebra strips extend in a longitudinal direction and have a relatively small cross-sectional area perpendicular to the longitudinal direction. This configuration would effectively prevent providing any wedge-shaped light pipe configuration, having an appreciable thickness, from being positioned beneath the LCD device since typically the distance spanned by the zebra strip between the LCD device and receiving printed circuit board contacts would be relatively small. Therefore, using zebra strips would generally not provide room for a significant thickness wedge-shaped structure to be positioned beneath the LCD devices.

As illustrated in FIG. 2, preferably the actual LCD device comprises a top glass cover plate 70 having an elongated horizontal shape which is joined to an elongated bottom plate 71 which includes the actual liquid crystal material. Generally the top glass plate 70 has a minor axis horizontal dimension perpendicular to the horizontal elongated axis dimension which exceeds the corresponding minor axis horizontal dimension of the bottom plate 71. This structure essentially forms an inverted vertical step or shoulder on the bottom surface of the LCD devices 20 and 21 wherein the recessed portions of the carrier 24 which receive the LCD devices also have a mating uninverted vertical step. This vertical step assists in properly laterally locating the LCD devices in the carrier 24.

It should be noted that the carrier top surface 25 has four raised portions 80 which extend vertically above the horizontal top surface plane of the LCD devices 20 and 21. The raised portions 80 comprise effective lateral extending portions of the carrier top surface 25 which are provided adjacent the recessed portions 27 and 28 of the top surface and are positioned adjacent, directly beneath, the graphics 15 to be illuminated. These raised portions can effectively contact the bottom surface of the coverplate 13 and essentially act as spacers to insure that the top surface of the LCD devices will not contact the bottom planar surface of the display coverplate 11. In addition, these raised portions of the carrier 24, since the carrier also functions as a light pipe, insure bright illumination of the associated graphics 15 on the coverplate 13 by insuring close positioning of the portions of the carrier 24 which provide illumination for the graphics. The raised portions 80 also form an effective wedge shape with the inclined wedge bottom surfaces to insure uniform graphic illumination. It should be noted that preferably the raised portions 80 extend vertically above the retainers clips 31 after assembly of these retainer clips to the carrier 24. This is to insure that the raised portions of the carrier act as spacers with regard to the coverplate rather than having the retainer clips 31 act as spacers. In this manner, accurately positioning the carrier-light pipe 24 with respect to the coverplate 13 is achieved. Preferably the carrier 24 and circuit board 30 are directly mounted to the coverplate 13 by any suitable mounting mechanism. This mounting mechanism is not shown in the drawings.

As illustrated in the drawings, the carrier 24 has vertically downwardly extending mounting posts 81 each having a threaded center hole 82 therein. The posts 81 extend below the wedge portion bottom surface. A plurality of mounting screws 83 having head portions 84 and have body portions which pass through holes 85 in the printed circuit board 30 and effectively join the carrier 24 to the printed circuit board 30. In this manner, the molded carrier 24 provides mounting posts which assist in mounting the carrier to its associated printed circuit board 30. This eliminates the need for additional mounting structure for the display assembly of the present invention. In addition, by providing the carrier 24 as a unitary molded part, separate spacers to position the carrier with respect to the display coverplate 13 can be eliminated and additional mounting structure for mounting the carrier to an associated printed circuit board is minimized.

Figure 5:
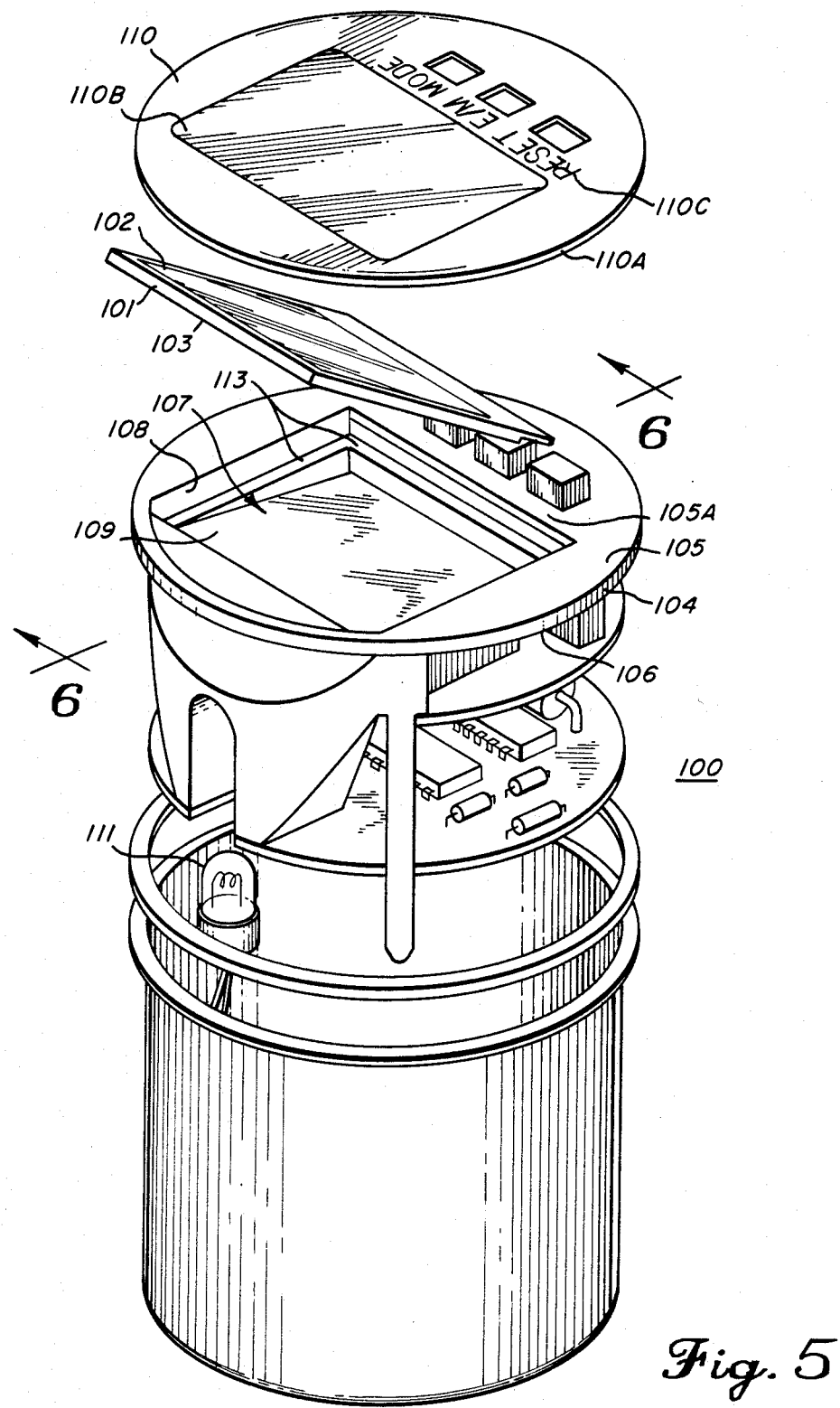
FIG. 5 is an exploded perspective view of several major components of the assembly shown in FIG. 4.
Figure 6:
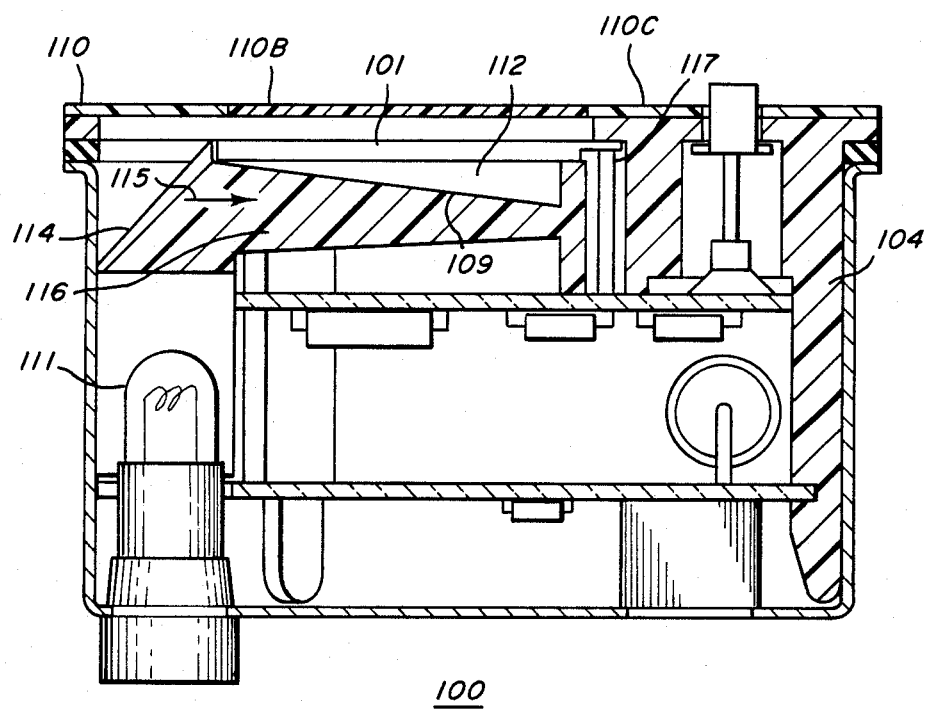
FIG. 6 is a cross-sectional view of the assembly shown in FIG. 5 taken along lines 6—6 after assembly.

Referring now to FIGS. 4, 5 and 6, an additional embodiment of the present invention is illustrated comprising an LCD display assembly 100 which is similar to the display assembly 10 illustrated in FIGS. 1-3. The display assembly 100 includes an LCD device 101 having a general plate-type configuration with substantially planar top and bottom surfaces 102 and 103. The LCD device 101 selectively provides a desired visual display when the LCD device is viewed from above the planar top surface 102.

A carrier 104 is made of light-transmitting plastic material and has top and bottom surfaces 105 and 106 with a top surface recessed portion 107 within which the LCD device is positioned. Edges 108 of the recessed portion 107 laterally surround the LCD and thereby laterally locate the LCD with respect the carrier. The carrier 104 has an integral substantially planar external surface 109 positioned beneath and inclined with respect to the LCD bottom surface 103. The carrier planar surface 109 is laterally positioned with respect to the LCD device 101 such that the LCD bottom surface 103 vertically projects downward onto the carrier planar external surface 109. The surface 109 forms part of the recessed portion 107.

A coverplate 110 is coupled to the carrier 104. A light source 111, comprising an incandescent light bulb, provides backlighting for said LCD device, and the light source is effectively positioned adjacent the carrier 104. The carrier 104 forms a light pipe for providing backlighting of said LCD device by the light source while also being part of a carrier structure for the LCD device. The carrier inclined planar surface 109 functions by directing light from said light source 111 towards said LCD planar bottom surface, and in this respect the surface 109 is similar in function to the wedge-shaped bottom surface 32B for the display assembly 10 shown in FIGS. 1-3 which reflects light toward the LCD bottom surface. Obviously the bottom surface of the wedge 32 for the assembly 10 concentrates light to obtain uniform backlighting of the LCD by providing a reflective function, and the inclined surface 109 is used to disperse light towards the LCD bottom surface.

It should be noted that the carrier inclined planar surface 109 in FIGS. 4-6 is spaced apart from the LCD bottom planar surface 103 by an air gap 112. While no such air gap is illustrated for the assembly 10 shown in FIGS. 1-3, clearly such an air gap could be provided, if desired, for that assembly while the assembly 10 still functioned in a substantially identical manner. The providing of the air gap 112 for assembly 100 is possible because the carrier recessed portion 107 includes peripheral support ledges 113 which contact and support peripheral portions of said LCD bottom surface 103. This allows the inclined surface 109 to directly face the LCD bottom planar surface 103 across the air gap 112.

The assembly 100 includes a reflector surface 114 positioned to reflect light from the light source 111 so as to provide a reflected light stream parallel to the LCD bottom planar surface 103. This reflected light stream is indicated by reference arrow 115 and is directed toward the inclined surface 109. The surface 109 has been provided with a rough surface finish so as to provide for light dispersion of the light reflected to this surface by the reflector surface 114. In this manner, the inclined surface 109 directs the reflected light so as to backlight the LCD.

The coverplate 110 has a bottom planar surface 110A which is effectively positioned adjacent the top surfaces 102 and 105 of the LCD device 101 and the carrier 104. The coverplate has an effective visual opening 110B therein so as to permit viewing of the LCD planar top surface 102. The coverplate also provides laterally-disposed graphics 110C adjacent the visual opening 110B. Lateral extending portions 105A of the carrier top surface 105 are provided adjacent the carrier recessed portion 107 and are also provided adjacent the graphics 110C so as to provide backlighting illumination of these graphics.

From the preceding description, it is apparent that a number of similarities and differences exist with respect to the LCD assemblies 10 and 100. In both instances, an inclined external surface of the carrier is positioned beneath the LCD bottom surface to provide LCD backlighting wherein the carrier functions not only as a light pipe but also as a mechanical mounting structure for the LCD device. While the assembly 10 discloses one type of retaining mechanism for biasing the LCD device towards the carrier, clearly other types of retaining mechanisms could be used to perform this same function. In the display assembly 100, a zebra strip 117 is part of a retainer means and is used to provide electrical connection to the LCD 101 and bias it against the carrier 104. Thus the zebra strip 117 is coupled to and joins together the LCD 101 and carrier 104. The display assembly 100 also illustrates that direct planar contact between the bottom LCD surface and a surface of the recessed portion of the carrier is not required, even though such planar contact was found to produce a brighter backlighting effect for the assembly 10. In addition, the display assembly 100 illustrates that the use of a reflector surface 114 can result in the "effective" positioning of the light source in an appropriate location. Also, it can be seen in FIG. 6 that additional sections 115 of the light carrier 104 can be used to concentrate light and direct it toward a thicker area 116 of the recessed portion of the light pipe. This means that the light source or reflector does not have to be directly adjacent to an external vertical major end surface of the recessed portion, but that light may just be directed to an effective internal major vertically projecting end surface of the recessed portion. This could also be the case with the display 10 wherein the major vertical end surface of the wedge could be an internal, rather than external, end surface.

In each of the embodiments 10 and 100, an inclined external surface of the carrier recessed portion is positioned beneath the LCD display. In the display 10, this inclined surface comprises the bottom surface of the wedge and results in reflecting light towards the LCD planar bottom surface. In display assembly 100, the inclined surface, by virtue of the exterior rough finish, results in directing light from the light source towards the LCD planar bottom surface, wherein this language also, in general, describes the operation of the display assembly 10. While the assembly 10 provides for a uniform backlighting of an LCD device, the assembly 100 also provides for LCD backlighting from a light source. While assembly 10 provides more uniform backlighting, assembly 100 provides more light uniformity across the LCD than would be obtainable without providing an inclined surface beneath the LCD unless a substantially more complex backlighting structure were utilized.

While specific embodiments of the present invention have been shown and described, further modifications and improvements will occur to those skilled in the art. All such modifications which retain the basic underlying principles disclosed and claimed herein are within the scope of this invention.

We claim:

1. An LCD display assembly comprising:
   at least one LCD device having a general plate-type configuration with substantially planar top and bottom surfaces, said LCD device selectively providing a desired visual display when said LCD device is viewed from above said planar top surface;
   a carrier having top and bottom surfaces, said carrier top surface having a recessed portion within which said LCD device is positioned, edges of said carrier recessed portion laterally surrounding said LCD device and thereby laterally locating said LCD device with respect to said carrier;
   retainer means coupled to and joining together said LCD device and said carrier, said retainer means having extending portions which contact peripheral portions of said LCD planar top surface and bias said LCD device against said carrier; and
   a light source for providing lighting for said LCD device;
   wherein the improvement comprises,
   said carrier being made of light transmitting material, said carrier having a generally wedge-shaped portion that has a substantially planar top surface, which is part of said carrier top surface recessed portion, positioned in effective planar surface contact with said LCD planar bottom surface, said wedge shaped portion having a substantially planar bottom surface inclined with respect to said wedge-shaped portion planar top surface, said wedge shaped portion having effective major and minor generally vertically projecting end surfaces between and located generally at opposite ends of said wedge-shaped portion planar top and bottom surfaces;
   said light source effectively positioned adjacent said major vertical end surface of said wedge portion, said wedge shaped portion forming a light pipe for obtaining uniform backlighting of said LCD device by said light source while also providing a carrier structure for said LCD device.

2. A display assembly according to claim 1 which includes a coverplate having a planar bottom surface effectively positioned adjacent the top surface of said LCD device and said carrier, said coverplate providing at least one effective visual opening to permit viewing of said LCD planar top surface and also providing laterally disposed graphics adjacent said visual opening, lateral extending portions of said carrier top surface are provided adjacent said carrier top surface recessed portion are positioned adjacent said graphics so as to provide backlighting illumination of said graphics.

3. A display assembly according to claim 2 wherein said lateral extending portions of said carrier top surface comprise effective lateral extensions of said wedge shaped portion planar top surface which also form an effective wedge shape with said wedge-shaped portion planar bottom surface so as to provide uniform illumination for said graphics.

4. A display assembly according to claim 3 wherein said lateral extending portions of said carrier top surface have portions raised above the plane of the top surface of said LCD device so as to effectively recess the LCD device beneath the plane of said coverplate planar bottom surface and thereby protect said LCD device.

5. A display assembly according to claim 4 wherein said raised portion of said lateral extending portions of said carrier top surface effectively contact portions of a bottom surface of said coverplate, which includes said coverplate planar bottom surface, so as to accurately position said carrier with respect to the coverplate.

6. A display assembly according to claim 1 wherein said retainer means has extending latching projections which, after assembly, contact said carrier and provide a snap-together subassembly, capable of assembly by hand, comprising at least said LCD device, said carrier and said retainer means.

7. A display assembly according to claim 6 wherein said retainer means extending latching projections contact the bottom surface of said carrier while said retainer means extending portions contact said LCD device peripheral portions.

8. A display assembly according to claim 7 wherein said carrier has end guide slots provided in said carrier which receive end portions of said retainer means and assist in locating said retainer with respect to said carrier.

9. A display assembly according to claim 8 wherein said retainer means comprises at least one plastic molded part generally comprising two main substantially planar extensions joined together and thereby forming an angle which is nominally less than the angle of carrier edge surfaces that will effectively planarly mate with portions of the retainer means two main planar extensions.

10. A display assembly according to claim 9 wherein said retainer means includes a pair of said plastic molded parts, each positioned for contacting an associated one of two opposite ends of said LCD planar top surface.

11. A display assembly according to claim 9 wherein one of said retainer means main planar extensions effectively forms a light source receiving cavity with a recessed portion of said carrier provided as part of said wedge-shaped portion major vertical projecting end surface.

12. A display assembly according to claim 11 wherein a surface of said main planar extension of said retainer means that faces said major vertical projecting end surface of said wedge-shaped portion effectively comprises light-reflective material so as to direct light from said light source into said wedge-shaped portion.

13. A display assembly according to claim 12 wherein one of said two main substantially planar extensions of said retainer means which, includes said retainer means extending portions which contact said LCD device, has a surface of light reflective material positioned adjacent said carrier top surface.

14. A display assembly according to claim 1 which includes at least a pair of said LCD devices and a pair of said wedge-shaped portions each wedge-shaped portion having planar top surface portions positioned adjacent and aligned substantially coplanar with respect to one another, one of said pair of said LCD devices being associated with and mounted to each of said wedge-shaped portions as recited in claim 1.

15. A display assembly according to claim 14 wherein bottom surfaces of each of said pair of wedge-shaped portions are inclined with respect to their associated wedge-shaped top surfaces, but are oriented such that they extend upwardly with respect to the plane of said wedge-shaped top surfaces, in generally opposite lateral directions and wherein each of said wedge-shaped portions thereby has its major vertical projecting end surface located at opposite ends of said carrier, and wherein a separate one of said light sources is effectively positioned adjacent to each of said major vertical projecting end surfaces of said wedge-shaped portions.

16. A display assembly according to claim 15 wherein said retainer means comprises a pair of separate retainer members each having extending portions which contact peripheral end portions of each of said LCD planar top surfaces, each of said retainer members positioned adjacent opposite vertical end surfaces of said carrier.

17. A display assembly according to claim 1 which includes drive electronics for the LCD device positioned below the wedge-shaped portion planar bottom surface, the drive electronics coupled to said LCD device by flexible flat printed circuit cable passing through an elongated slot in said carrier.

18. A display assembly according to claim 1 wherein said carrier has threaded mounting posts extending below said wedge-shaped portion planar bottom surface and wherein the assembly includes a printed circuit board and mounting screws, said mounting screws mating with said mounting posts and attaching said carrier to said printed circuit board.

19. An LCD display assembly comprising:
at least one LCD device having a general plate-type configuration with substantially planar top and bottom surfaces, said LCD device selectively providing a desired visual display when said LCD device is viewed from above said planar top surface;
a carrier having top and bottom surfaces, said carrier top surface having a recessed portion within which said LCD device is positioned, edges of said carrier recessed portion laterally surrounding said LCD device and thereby laterally locating said LCD device with respect to said carrier;
retainer means coupled to and joining together said LCD device and said carrier; and
a light source for providing lighting for said LCD device;
wherein the improvement comprises:
said carrier being made of light transmitting material, said carrier having an integral generally wedge-shaped portion that has a substantially planar top surface, which is part of said carrier top surface recessed portion, positioned beneath and facing said LCD bottom surface, said wedge-shaped portion having a substantially planar bottom surface inclined with respect to said wedge-shaped portion planar top surface, said wedge-shaped portion having effective major and minor generally vertically projecting end surfaces between and located generally at opposite ends of said wedge-shaped portion planar top and bottom surfaces;
said light source effectively positioned adjacent said major vertical end surface of said wedge-shaped portion, said wedge-shaped portion forming a light pipe for obtaining uniform backlighting of said LCD device by said light source while also being part of a carrier structure for said LCD device.

20. An LCD display assembly comprising:
at least one LCD device having a general plate-type configuration with substantially planar top and bottom surfaces, said LCD device selectively providing a desired visual display when said LCD device is viewed from above said planar top surface;

a carrier having top and bottom surfaces, said carrier top surface having a recessed portion within which said LCD device is positioned, edges of said carrier recessed portion laterally surrounding said LCD device and thereby laterally locating said LCD device with respect to said carrier;

retainer means coupled to and joining together said LCD device and said carrier; and a light source for providing lighting for said LCD device;

wherein the improvement comprises:

said carrier being made of light transmitting material, said carrier having an integral substantially planar external surface, positioned beneath and inclined with respect to said LCD planar bottom surface, said carrier inclined external surface laterally positioned such that LCD planar bottom surface vertically projects onto said carrier planar external surface;

said light source effectively positioned adjacent said carrier which forms a light pipe for obtaining backlighting of said LCD device by said light source while also providing a carrier structure for said LCD device, said carrier inclined planar external surface directing light from said light source toward said LCD planar bottom surface.

21. A display assembly according to claim 20 wherein said carrier inclined planar external surface is spaced apart from said LCD planar bottom surface by an air gap.

22. A display assembly according to claim 21 wherein said carrier inclined planar external surface directly faces said LCD planar bottom surface across said air gap.

23. A display assembly according to claim 22 wherein said carrier recessed portion has peripheral support ledges which contact and support peripheral portions of said LCD planar bottom surface.

24. A display assembly according to claim 20 wherein said carrier inclined planar surface has a rough surface finish to provide light dispersion.

25. A display assembly according to claim 24 which includes a reflector surface positioned to reflect light from said light source parallel to said LCD planar bottom surface, said reflected light being directed toward said carrier inclined planar external surface.

26. A display assembly according to claim 20 wherein said retainer means includes a coverplate having a planar bottom surface effectively positioned adjacent the top surfaces of said LCD device and said carrier, said coverplate providing at least one effective visual opening to permit viewing of said LCD planar top surface and also providing laterally-disposed graphics adjacent said visual opening, lateral extending portions of said carrier top surface are provided adjacent said carrier top surface recessed portion and are positioned adjacent said graphics so as to provide backlighting illumination of said laterally-disposed graphics.

* * * * *